(12) United States Patent
Boudenne et al.

(10) Patent No.: US 7,531,360 B2
(45) Date of Patent: May 12, 2009

(54) METHOD OF DECHLORINATION TREATMENT OF FLOWING WATER, IN PARTICULAR UPSTREAM OF A BIOLOGICAL POLLUTION DETECTOR

(75) Inventors: Jean-Luc Boudenne, Marseilles (FR); Bruno Coulomb, Bouc Bel Air (FR); Gerard Lieutaud, Marseilles (FR)

(73) Assignee: Societe des Eaux de Marseille, Marseilles (FR)

( * ) Notice: Subject to any disclaimer, the term of this patent is extended or adjusted under 35 U.S.C. 154(b) by 113 days.

(21) Appl. No.: 11/474,945

(22) Filed: Jun. 27, 2006

(65) Prior Publication Data

US 2007/0000846 A1    Jan. 4, 2007

Related U.S. Application Data

(60) Provisional application No. 60/729,731, filed on Oct. 25, 2005.

(30) Foreign Application Priority Data

Jul. 1, 2005    (FR) .................................. 05 07000

(51) Int. Cl.
*G01N 33/00*    (2006.01)
*B09C 1/00*    (2006.01)
*C02F 1/00*    (2006.01)

(52) U.S. Cl. ........................ 436/125; 436/175; 436/177; 210/747; 210/739; 210/754; 210/756; 210/757

(58) Field of Classification Search ................ 210/757, 210/765, 167.23, 167.21, 167.3, 170.02, 210/170.09, 170.1, 170.11, 198.1, 194, 739, 210/747, 754, 756; 119/268, 226; 436/125, 436/175, 177

See application file for complete search history.

(56) References Cited

U.S. PATENT DOCUMENTS 4,500,510 A      2/1985    Goldstein et al.
4,626,992 A  *  12/1986    Greaves et al. .............. 600/300

(Continued)

OTHER PUBLICATIONS

BioTech: Dictionary Search Results for "limiting reagent," 1998.*

(Continued)

*Primary Examiner*—Matthew O Savage
*Assistant Examiner*—Lucas Stelling
(74) *Attorney, Agent, or Firm*—Dennison, Schultz & MacDonald

(57) ABSTRACT

A selective method of dechlorination treatment of circulating water containing disinfectant chlorine in the form of $ClO^-$, $HClO$, $ClO_2$ or chloramine, where an ascorbic acid aqueous solution is injected from a storage reservoir into the water flow, the mass flow rate of the injected ascorbic acid solution being regulated with respect to the mass flow rate of the chlorine in the circulating water to be treated, in such a way that the ratio (R) of the ascorbic acid and chlorine mass flow rates (R=D1/D2) is between 2.5 and 4, preferably less than or equal to 3. The method can be used for treatment of water that feeds into a biological detector containing a disinfectant chlorine content that is incompatible with the survival of the biological species used in the detector. The disinfectant chlorine level in the circulating water after mixing is maintained at a value lower than or equal to 0.6 mg/l, and preferably lower than or equal to the detectable limit.

15 Claims, 2 Drawing Sheets

U.S. PATENT DOCUMENTS

Figure 1:
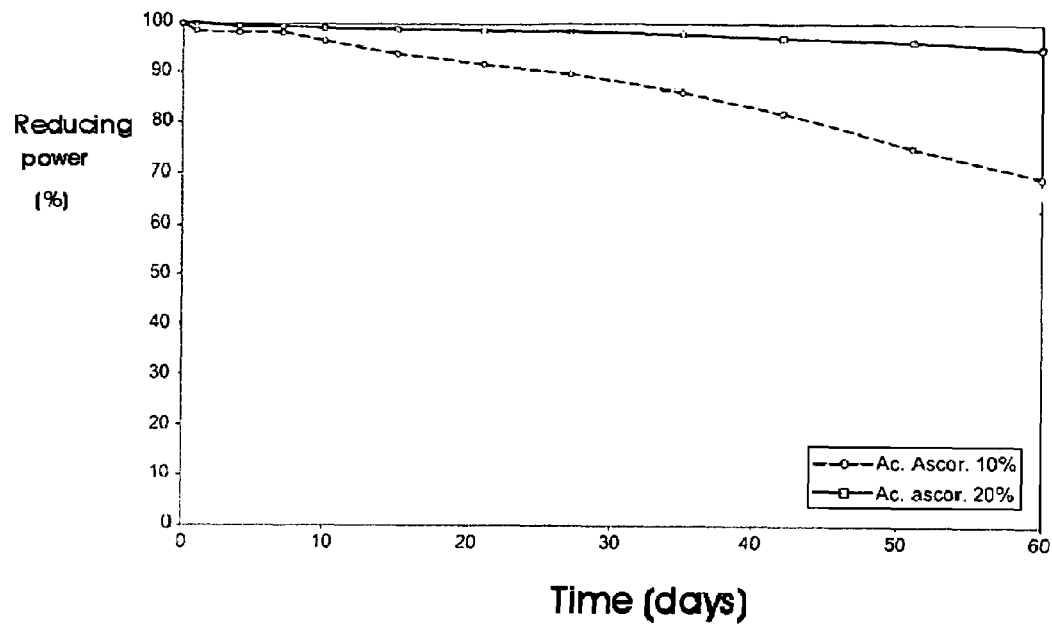

| | | | |
|---|---|---|---|
| 5,203,366 A * | 4/1993 | Czeck et al. | 137/3 |
| 5,685,987 A * | 11/1997 | Hixon et al. | 210/636 |
| 6,264,846 B1 * | 7/2001 | Smith | 210/749 |
| 6,328,896 B1 | 12/2001 | Atnoor et al. | |
| 6,998,057 B2 * | 2/2006 | Ferguson et al. | 210/739 |
| 7,041,218 B1 * | 5/2006 | Liles | 210/512.1 |
| 2002/0125198 A1 | 9/2002 | Simpson | |
| 2004/0069719 A1 | 4/2004 | Wang | |
| 2004/0147030 A1 | 7/2004 | Nerbert | |

OTHER PUBLICATIONS

EPA Guidance Manual: Alternative Disinfectants and Oxidants, 1999, Chapter 4, p. 1.*

Malinckrodt Package insert for Ascorbic Acid Injection, USP, Jan. 1997.*

The Merck Index, 14th ed, Monograph No. 00830, for "ascorbic acid".*

Theil Aqua Tech Vitamin C, Apr. 1998, "Shelf-life of Vitamin C".*

* cited by examiner

METHOD OF DECHLORINATION TREATMENT OF FLOWING WATER, IN PARTICULAR UPSTREAM OF A BIOLOGICAL POLLUTION DETECTOR

This application claims the priority of U.S. Provisional Application 60/729,731 filed Oct. 25, 2005, and French Application 05/07000 filed Jul. 1, 2005.

The present invention relates to a method of dechlorination of flowing water, in particular upstream of a biological pollution detector.

The present invention relates more particularly to the treatment of water containing chlorine implemented as a disinfecting agent, namely with a degree of oxidation of +1, in the form of $ClO^-$ and $HClO$ and/or in the form of monochloramine $NHCl_2$, and/or with a degree of oxidation of +4 in the form of $ClO_2$.

The pollution of water, in particular of drinking water, can be caused by a multiplicity of more or less toxic substances and it is not possible to detect the presence of each of these substances individually.

To monitor the acceptable quality of drinking water, biological detectors, whose principle consists of assuring that animals which are highly sensitive to pollution live normally in the water to be tested, are used. The choice of animals naturally falls on fish and most often on small trout called "fingerlings" which are highly sensitive to most pollution and whose sensitivity is even higher when they are small. The death of small trout thus constitutes evidence for general pollution.

The principle of biological detectors is thus founded on the detection of the survival of live species used as a bioindicator of the presence of a toxic pollutant.

A known device consists of a tank in the form of a basin in which one or more trout live and in which the survival of the aforementioned trout is detected by various means.

In FR 2,573,875 is described a biological detector that makes it possible to automatically detect the death of all live fish in a tank, in which the water to be tested circulates, in such a way that the signal transmitted by the means of detection can be used to trigger an alarm and/or an automatic mechanism while eliminating the risks of a false alarm.

More precisely, in FR 2.573.875 is used a volumetric movement detector aimed at detecting the absence of the simultaneous movement of all the fish, said volumetric movement detector being comprised of an acoustic wave emitter (sonar) and one or more electroacoustic transducers functioning as receivers and containing in addition electronic circuits which receive the electric signals delivered by the said detector, said circuits containing a variety of components which receive the signals sent by the transmitter and by the said receivers, a low-pass filter whose cut-off frequency is lower than the frequency of the said transmitter, a rectifier which receives the filtered signals and which delivers a continuous signal with a reference signal and which actuates an alarm and/or an automatic mechanism if the said continuous signal becomes lower than that of the reference signal. This volumetric movement detector detects in fact a simultaneous absence of movement of all the fish and is sufficiently sensitive to the movements of the fish to eliminate interference signals due to water turbulence. This device, known as "TruitoSEM," is a tool for the detection of traces of pollutants and/or toxins in untreated water intended for the production of drinking water, based on the optical observation of trout fingerling behavior.

The biological pollution detectors existing on the market present the principal disadvantage of not being appropriate for water containing levels of chlorinated compounds used as disinfecting agents such as mentioned above that are incompatible with the survival of the live species, such as fish, bacteria, molds and daphnia, used as bioindicators of the presence of toxic pollutants.

In Europe, the chlorine used as a disinfecting agent in drinking water is authorized only in the form of $ClO^-$, $HClO$, $Cl_2$ and $ClO_2$, and chloramines ($NHCl_2$) must not exceed 0.1 mg/l. In Canada and in the United States, the use of monochloramine as a disinfecting agent is authorized. It is advisable to observe here that chlorine in the form of $Cl_2$ gas can be used as a disinfecting agent, but it is not stable in solution and automatically transforms into $ClO^{--}$ and $HClO$ in water.

In particular, it has been shown that the movements of biological indicators such as fish were altered in the presence of 0.7 mg/l expressed as an equivalent of $Cl_2$ of chlorine disinfectant in the form of $ClO^-$, $ClO_2$ or $NHCl_2$, a concentration which leads to the triggering of a sonar-type alarm system, independently of any actual pollution. Concentrations higher than 1.4 mg/l lead to a lethality greater than 50%. Chlorine levels in drinking water are the subject of regulation in various countries. In the United States, the acceptable level of chlorine in drinking water is up to 4 mg/l, expressed in equivalent $Cl_2$ for chlorine in the form of $ClO_2$ and $ClO^-/HClO$, and to 2 mg/l for the monochloramines, expressed in $NHCl_2$ (which is 1.45 mg/l expressed in equivalent $Cl_2$). The levels of chlorine that lead to the initial negative effects on trout fingerlings are thus quite lower than the levels encountered in the water distributed in North America.

Various chemical products exist which make it possible to eliminate chlorine, such as sodium sulfite ($Na_2SO_3$), sodium bisulfite ($NaHSO_3$), sodium metabisulfite ($Na_2S_2O_5$), sulfur dioxide ($SO_2$), ascorbic acid or sodium ascorbate, hydrogen peroxide ($H_2O_2$), oxalic acid ($C_2O_4H_2$), sodium nitrite ($NaNO_2$), sodium thiosulfate ($Na_2S_2O_3$) and calcium thiosulfate ($Ca_2S_2O_3$).

The aim of the present invention is thus to provide a selective method of testing and eliminating chlorinated compounds used as disinfecting agents, namely chlorinated compounds with chlorine with a degree of oxidation of +1, in the form of $ClO^-$, $HClO$ or monochloramine, and/or with chlorine with a degree of oxidation of +4 in the form of $ClO_2$, present in the circulating water that feeds biological pollution detectors or aquariums, at levels incompatible with the survival of live species.

A more general aim of the present invention is to provide a selective method of water dechlorination treatment which can be extended to any type of water containing chlorine disinfectant in concentrations incompatible with the survival of live species and, more particularly, a treatment method for water intended for human consumption, either downstream of or within a drinking water treatment plant.

The inventors carried out a number of experiments to test the various known dechlorination agents mentioned above. These tests led to failures, either because the products or the implementation conditions thereof were toxic for the live species and thus could not be employed in the biological pollution detection systems, due in particular to changes in pH and/or oxygen content, or because the chemical reagents were degraded over time or because the reagents did not act quickly enough.

Indeed, a problem involved in the treatment of water feeding a biological detector is that, in the case of the treatment of circulating water, the reagent must make it possible to eliminate the chlorine in a flowing system and thus the kinetics of the reaction with the chlorine must be very rapid.

In addition, another aim of the present invention is to provide a method of treatment requiring minimal maintenance and using a product that is water soluble and that can be injected continuously.

Another problem is thus that the reagent must have a sufficiently long duration of life or effectiveness to be compatible with the replenishment of the live species commonly used in biological pollution detectors, in general from 30 to 45 days, in order to ensure minimal maintenance, so that the proposed treatment system makes it possible to dechlorinate the water continuously for at least 30 days, preferably 45 days, even 60 days, without any human intervention.

Finally and above all, the use of the reagent must not mask the presence of toxic pollutants flowing, voluntarily or involuntarily, into the distribution networks and must thus maintain the function and effectiveness of the biological detectors commonly used as warning stations in order not to cause the artificial elimination of other toxic compounds.

The optimal reducing agent for the dechlorination of water feeding biological detectors containing trout fingerlings, for example, must thus meet the following conditions:
stability of at least a month,
rapid chlorine reaction kinetics,
absence of toxicity for the live species, and in particular maintenance of the physicochemical conditions of pH and of dissolved $O_2$ content,
no generation of toxic reaction by-products.

Sodium bisulfite appeared to exhibit the majority of the required criteria but, under the various implementation conditions tested, sodium bisulfite led to a severe reduction in dissolved oxygen and in pH in the water during the reaction which was undoubtedly the likely cause of the death of the trout fingerlings.

Sodium ascorbate also appeared to be a good candidate, however its lack of stability did not allow its retention.

The inventors had to conduct a number of studies to test the various reagents and conditions of storage and of implementation, and were able to determine that, by means of a fine regulation of the addition of ascorbic acid in terms of the concentration of ascorbic acid and rate of injection in the current of water to be treated, the various objectives of the present invention could be achieved.

More precisely, the present invention proposes a treatment for the reduction of the said chlorinated disinfecting agents, reduced to the form $Cl^-$ using ascorbic acid, by the injection of an ascorbic acid solution stored in a reservoir.

According to the present invention, the ratio of the mass flow rate of the ascorbic acid of the injected solution is regulated with respect to the mass flow rate of the said chlorinated disinfecting compounds in the water to be treated, expressed in equivalent $Cl_2$, in such a way that it is maintained relatively stable at a given value between 2,5 and 4.

More precisely, the present invention provides a method of treatment of water in circulation containing disinfectant chlorine in the form of $ClO^-$, $HClO$, $ClO_2$ and/or $NHCl_2$, wherein an aqueous solution of ascorbic acid from a storage reservoir is injected into said flow of water to be treated, the mass flow rate (D1) of the ascorbic acid of the said aqueous solution of ascorbic acid injected being regulated with respect to the mass flow rate (D2) of the said disinfectant chlorine in the circulating water to be treated, expressed in equivalent $Cl_2$, in such a way that the ratio (R) of the said mass flow rates of ascorbic acid and said disinfectant chlorine (R=D1/D2) is between 2,5 and 4.

The present invention makes possible a selective dechlorination treatment with respect to chlorinated species only with a degree of oxidation of +1 or +4, namely in the form of $ClO_2$ (+4) or $ClO^-/HClO$ and/or chloramine (+1), within the framework of a flowing treatment of circulating water.

Thus here "disinfectant chlorine" is understood to mean any chlorine that is free or that is combined in the water to be treated in the form of $Cl_2$, $ClO^-$, $HClO$, $ClO_2$ and monochloramine.

Thus the disinfectant chlorine level can be reduced to a value below 0.6 mg/ml, even below 0.1 mg/l, expressed in $Cl_2$, which is, in practice, the limit of detection of chlorine during the analysis of circulating water.

These conditions of the implementation of the ascorbic acid solution and of the precise regulation of the addition of the chemical reagent make it possible, as will be shown below, to obtain a rapid reaction with sufficient reducing power. Indeed, according to the present invention, a ratio R greater than 2.5 thus corresponds to controlled over-concentration conditions compared to the stoichiometric ratio of the ascorbic acid reaction with respect to the said chlorine species, in a way that compensates for, on one hand, the decrease in the reaction kinetics resulting from the flowing implementation conditions, as well as compensating for, on the other hand, the degradation of the ascorbic acid into dehydroascorbic acid during the time in the said storage reservoir, for a period of time of at least 30 days, even up to 60 days.

The theoretical mass ratios of the stoichiometric reactions, expressed in equivalent $Cl_2$, are R=2.37 for the monochloramines and 2.48 for the chlorinated compounds $ClO^-$, $HClO$ and $ClO_2$.

But this over-concentration is limited, namely less than 4, preferably less than or equal to 3, to assure that the quasi-totality of the ascorbic is well consumed in the reaction with the said chlorinated species and to avoid a change in physicochemical parameters such as pH or the concentration of $O_2$ dissolved in the water after the reaction. Such a reaction would have a lethal effect or would affect the vitality of the live species and in particular of the trout fingerlings, and thus would also even effect the biological detectors or aquariums downstream of the circulating water to be treated.

This precise regulation of the addition of the chemical reagent thus makes it possible not to mask the presence of toxic pollutants flowing voluntarily or involuntarily into the distribution networks and thus to maintain the effectiveness of the biological detectors commonly used as warning stations. Indeed, an imprecise regulation of the addition of ascorbic acid and in particular an addition in excess would lead not only to the elimination of chlorine and its derivatives but also to the artificial elimination of toxic compounds. It is thus necessary to add the ascorbic acid in a quantity that is exactly sufficient to eliminate the chlorine and its derivatives, and only the chlorine and its derivatives. Thus a concentration in ascorbic acid must be maintained that is just necessary and sufficient to react with the chlorine present but not with other toxic products. This limited over-concentration makes it possible in particular for the ascorbic acid not to react with the chlorinated pollutant species to be detected, such as the chlorites ($ClO_3^-$) or the chlorates ($ClO_4^-$).

In addition, of course, this precise regulation allows the reagent to be economized.

In a preferred embodiment, for a selective dechlorination treatment of water containing disinfectant chlorine more or less exclusively in the form of $ClO_2$, $ClO^-$, $HClO$ and/or monochloramine, the ratio R of the mass flow rates of ascorbic acid D1 and of chlorine D2 is preferably maintained more or less stable at a given value less than or equal to 3, preferably still equal to 3.

Preferably, the ascorbic acid concentration in the said injected ascorbic acid aqueous solution is greater than 10%

(100 g/l), preferably still greater than or equal to 20% (200 g/l). This characteristic contributes to the maintenance of the reducing power of the ascorbic acid by avoiding the transformation of the ascorbic acid into dehydroascorbic acid, in particular for at least 30 days, even up to 60 days.

According to other advantageous characteristics:

the said ascorbic acid aqueous solution and the said chlorinated water solution to be treated is mixed in a mixer allowing the rapid homogenization of the two fluids, preferably a static mixer, more preferably a helicoid static mixer, the said ascorbic acid aqueous solution storage reservoir is maintained in darkness and at ambient temperature in an enclosure, preferably a Peltier-effect refrigerator.

The inventors have discovered that the conditions of use and of storage of the chemical reagent and its derivatives, in particular the injection parameters of this compound (flow rate, proportions) and the use of various means allowing the regulation of the whole of the dechlorination method are determinants in meeting the objectives and in resolving the problems mentioned above.

This continuous elimination of chlorine must indeed be regulated with respect to the chlorine content by the concentration of ascorbic acid used, by its injection flow rate and by the type of mixer used (to be adapted according to the operating flow rate of the biological detector to which the present invention is coupled).

In a particularly advantageous embodiment, the said ascorbic acid aqueous solution is injected using a metering pump controlled by an analyzer of the chlorine concentration in the water to be treated, in such a way as to regulate the mass flow rate of the said ascorbic acid aqueous solution injected according to the said chlorine concentration.

In practice, the volume flow rate of the said ascorbic acid solution injected is regulated taking into account the ascorbic acid concentration in the stored ascorbic acid aqueous solution.

Preferably, the said ascorbic acid solution is stored for 60 days at most, preferably 30 days at most.

According to other particular characteristics:

the said disinfectant chlorine concentration of the water to be treated is between 0.1 mg/l and 5 mg/l, expressed in equivalent $Cl_2$, and the volume flow rate of the water to be treated is between 100 l/h and 1000 l/h.

For such volume flow rates and chlorine concentrations, the ascorbic acid volume flow rate is on the order of 0.01 l/h to 0.1 l/h.

More particularly still, the pH of the water to be treated is between 6 and 8.5.

This method can be extended to any type of water containing the said disinfectant chlorine in concentrations that are incompatible with the survival of live species.

The invention makes possible the elimination of the said disinfectant chlorine present in treated water, intended for human consumption, downstream of or within drinking water treatment plants. This method makes it possible to rapidly eliminate the said flowing disinfectant chlorine regardless of the initial concentrations of the said disinfectant-chlorine.

The present invention is more particularly advantageous when used to treat water which feeds a biological detector, an aquarium or a fish pond and which contains a chlorine content incompatible with the survival of the respective biological species used in the said biological detector, aquarium or fish pond.

More particularly still, the said biological detector is founded on the principle of the detection of the movements of fish (for example trout fingerlings) in a tank.

Preferably, the level of the said disinfectant chlorine in the circulating water after mixing is maintained at a value less than or equal to 0.6 mg/l, more preferably less than or equal to the detectable limit of 0.1 mg/l expressed in equivalent $Cl_2$.

The invention makes it possible to extend the application of any biological detector used for the purpose of detecting accidental or voluntary pollution in drinking water distribution networks, and in particular in water that is strongly chlorinated in chlorinated compounds which are incompatible with the survival of the biological species commonly used in such systems.

More particularly, the present invention relates to a water pollution detection method in which a biological detector is coupled with a water dechlorination treatment downstream of or within said detectors.

Figure 2:
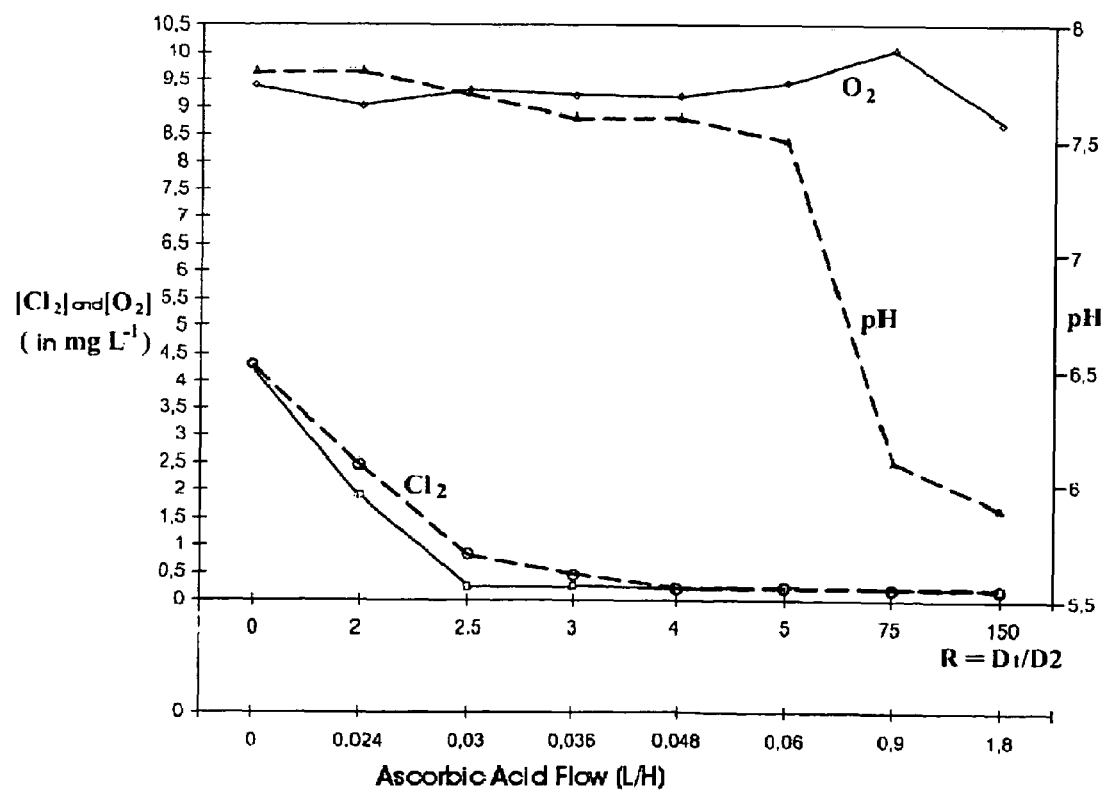
Figure 3:
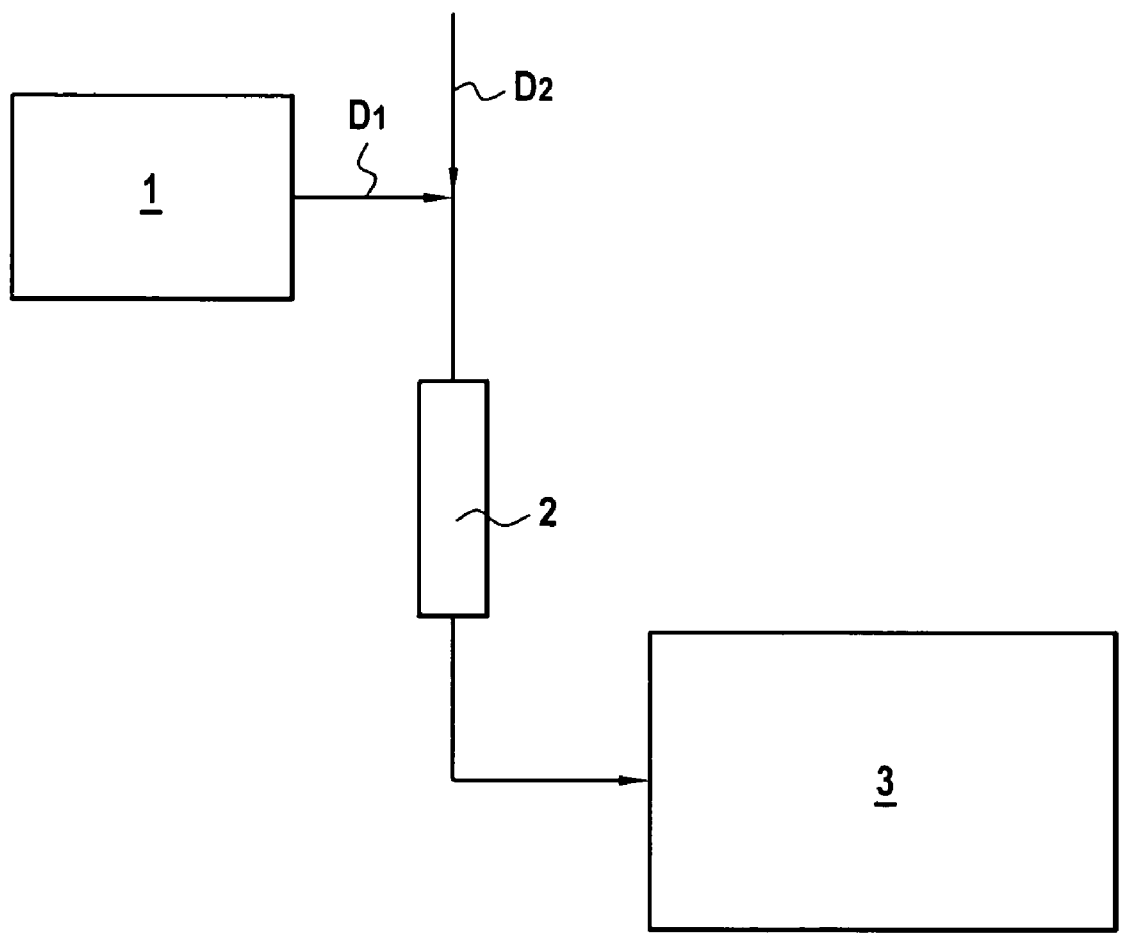

Other characteristics and advantages of the present invention will appear in light of the following description, made in reference to the appended figures in which:

FIG. 1 represents the reducing power of ascorbic acid (%) as a function of time for ascorbic acid at a concentration of 10% (100 g/l) and for ascorbic acid at a concentration of 20% (200 g/l), FIG. 2 represents the pH values (- - -) and the dissolved oxygen concentration (—), as well as the chlorine concentration, in the water treated after the reaction with ascorbic acid according to the ratio (R) of the mass flow rate of the injected solution of ascorbic acid (D1) to the mass flow rate of the chlorine in the water to be treated (D2); the chlorine concentrations (mg/l) were measured respectively for ascorbic acid solutions stored for t=0 days (-o-o-) and for t=60 days (-□-□-), and FIG. 3 represents an installation diagram of a treatment system according to the invention upstream of a biological detector.

Chlorine is the most used disinfectant for the elimination of pathogenic germs and for the sanitary safety of the transport of water in pipes. If chlorine is placed in the water, it penetrates within the bacteria by diffusing across the cytoplasmic membrane and there it blocks enzymatic activity which causes the organism in question to be destroyed. Viruses being more resistant, the treatment conditions are regulated according to their destruction. Treatment is thus regulated by concentration and by time in contact. If the concentration is increased, it takes less time in contact and vice versa.

Chlorine can combine in water in several ways. Thus, as a function of the pH of the water, a balance between 3 chemical species is established:

chlorine in a dissolved molecular state, $Cl_2$, hypochlorous acid, HClO, hypochlorite ion, $ClO^-$.

Hypochlorous acid is 100 times more disinfecting that the hypochlorite ion at a pH between 4 and 6 because it can more easily cross the cellular membrane of microorganisms and destroy intracellular substances. This pH being often higher, it is thus necessary to increase the concentration and/or the time in contact.

As soon as chlorine is placed in water, it reacts with nitrogenous compounds, ammonia in particular, with which it combines to form chloramines. Although more stable, these chloramines also have a disinfecting effect, but 5 times less than the hypochlorite ion and 500 times less than hypochlorous acid. It is often these chloramines which give water an unpleasant taste.

The products used for disinfection with chlorine are: sodium hypochlorite, calcium hypochlorite, chlorine dioxide and chlorine gas. The latter is used most because it is easier to work with. It is stored in liquid state in pressurized bottles or tanks. This makes it possible to obtain 1.2 liters of chlorine for 1 liter of volume. By comparison, 1 liter of sodium hypochlorite at 48° (chlorometric degrees) contains only 150 g/l of chlorine expressed in equivalent $Cl_2$. A 50 kg bottle of chlorine is equivalent to 400 kg of sodium hypochlorite. Moreover, chlorine is stable in liquid or gas state, contrary to sodium hypochlorite solutions. Then, it is in gas form that the chlorine is introduced into the water, using a hydroejector.

Another product, chlorine dioxide ($ClO_2$), is used more and more often. This has the advantage of an effectiveness that is quite higher than chlorine gas and hypochlorites. It is 10 times more water soluble and has a more marked residual effect. It makes it possible to effectively eliminate humic substances and even phenols and iron and manganese oxides more quickly, and to fight against pathogenic algae and cells, all across a broad range of pH. The disadvantage lies primarily in the installations necessary for production and chlorination.

In the past in North America, inorganic monochloramine ($NH_2Cl$) was widely used, but it is rarely used today because of slow oxidation kinetics compared to the substances mentioned above, and because of uncertainty as to the risks it poses for human health.

In the range of drinking water pH, it is thus the forms $HClO$ and $ClO^-$ (called "free chlorine") which are present. The distribution of these two forms will depend on pH, temperature and the presence of oxidizable species.

The disinfectant chlorine concentrations in North American distribution networks (3 to 4 mg/l), expressed in equivalent $Cl_2$, are much higher than in Europe (0.1 to 0.2 mg/l); these concentrations are incompatible with fish survival, as has been shown in a number of publications (the total residual chlorine concentration must be lower than 0.015 mg/l, expressed in $HClO$).

Several studies involving fish have shown that free or combined chlorine can have harmful effects on the structure of the gills and the capacity of hemoglobin to transport oxygen in the blood. The damage sustained by the membranes of the gills and the oxidation of hemoglobin into methemoglobin would indicate that the final cause of mortality following exposure to free or combined chlorine is asphyxiation. Moreover, according to several studies, free chlorine and combined chlorine could exert their toxicity on other sites, such as in the nervous system in which the exposure to residual chlorine was shown to increase the permeability of the gills, which could lead to an increase in the accumulation (and, consequently, in the toxicity) of other chemical substances present in chlorinated wastewater.

This toxicity of chlorine for trout fingerlings has also been shown by the inventors. Twelve trout fingerlings were maintained in an aquarium containing water chlorinated with increasing concentrations of sodium hypochlorite. Each chlorine concentration was maintained for a period of 8 hours. The aquarium was placed under permanent aeration using an air pump equipped with a porous diffuser. The following table presents the results observed during this experiment.

The following table presents the results observed during this experiment. ($[Cl_2]$=chlorine disinfectant expressed in equivalent $Cl_2$.)

| $[Cl_2]$ (in mg/l) | Effects observed | Mortality % observed |
|---|---|---|
| 0.25 | No effect. | 0 |
| 0.70 | Reduction in mobility. Accelerated ventilation. | 10 |
| 1.4 | Highly reduced mobility. Loss of appetite. Very high ventilation. Reduction in the size of the iris. | 60 |
| 2.1 | Swimming on the side then on the back. Death. | 100 |

It appears that disinfectant chlorine concentrations higher than 2 mg/l expressed in equivalent $Cl_2$ are lethal for trout fingerlings. In addition, the mobility of trout fingerlings appears very rapidly affected at chlorine concentrations greater than or equal to 0.7 mg/l. This loss of mobility could lead to the triggering of an alarm by the sonar-type acoustic sensor of the TruitoSEM biological detector (not used in this study).

The chlorine concentrations that lead to the initial negative effects in trout fingerlings are thus quite lower than the concentrations encountered in water distributed in North America. It thus appears important to proceed with a dechlorination of the water when a TruitoSEM biological detector is installed at these sites.

As the first tests with sodium bisulfite were unsuccessful, various tests were then carried out in order to propose a reducing agent more appropriate for use with a biological detector. Indeed, the acceptable product must not:

react, or react very little, with the oxygen dissolved in the medium;

strongly influence pH;

be toxic to trout fingerlings;

generate toxic by-products.

Once the reducing agent was chosen, experiments were carried out, initially in static (batch) mode to determine the optimal operating conditions and then under real ("flowing") conditions in the presence of trout fingerlings, using a biological detector.

The ascorbic acid reaction pathway is complex and can lead to various chemical species depending on the aerobic or anaerobic conditions of the medium. Aerobic conditions lead primarily to the production of reductones according to the following pathway:

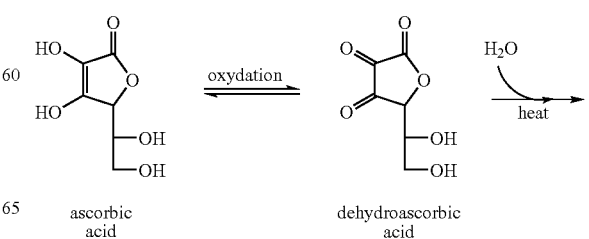

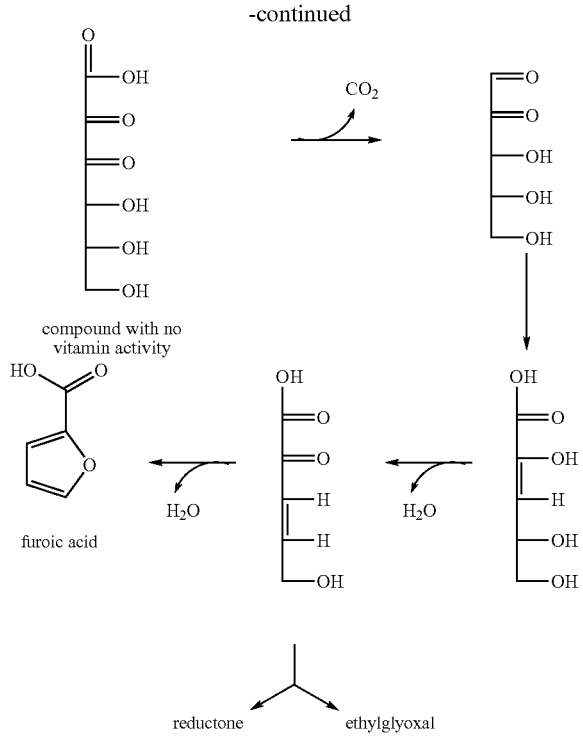

compound with no vitamin activity furoic acid reductone   ethylglyoxal

This oxidation of ascorbic acid is encouraged by heat, light, an acid medium (optimal conditions: T=100° C. and a 5% $H_2SO_4$ medium) or the presence of bacterial strains that produce ascorbic acid oxidase.

The monitoring of an ascorbic acid solution by molecular absorption spectrophotometry in the ultraviolet range thus shows a change in the spectrum and thus in the chemical form over time, probably by the combined effect of heat and light. A shift in wavelength between ascorbic acid and a degradation by-product can be observed in the spectra.

However, the chemical species resulting from the degradation of ascorbic acid can retain a strong reducing power.

According to the following reduction reactions of hypochlorous acid or of hypochlorite ion by ascorbic acid, the oxidant and the reducing agent react mole to mole.

$$C_5H_5O_5CH_2OH + HClO \rightarrow C_5H_3O_5CH_2OH + HCl + H_2O$$

$$C_5H_5O_5CH_2OH + NaClO \rightarrow C_5H_3O_5CH_2OH + NaCl + H_2O$$

At pH=8, 80% of the chlorine in the water is present in the form of hypochlorite ($ClO^-$) and 20% in the form of hypochlorous acid (HClO).

The quantity of ascorbic acid necessary for the reduction of a given concentration of sodium hypochlorite was verified by experimentation. The tests were carried out on solutions of ascorbic acid and of bleach ($Na^+$, $ClO^-$) in equal molarities of $1.55 \times 10^{-4}$ mole/liter, which is, respectively, 27.34 ppm and 8 ppm, in order to facilitate the monitoring of the reactions. An efficiency rate of 100% is attained as of the implementation of a mole to mole reaction (ratio 1).

This initial result makes it possible to calculate the theoretical concentration of ascorbic acid to inject to dechlorinate water. On the basis of a maximum amount of residual chlorine (expressed in $Cl_2$) of 4 mg/l (which is 2.9 mg/l or $5.63 \times 10^{-5}$ mol/l of $ClO^-$) in water distributed in North America, dechlorination will be effective with $5.63 \times 10^{-5}$ mol/l of ascorbic acid, or 9.92 mg/l. This reaction will produce in addition 2 mg/l of chloride ions. There is thus a ratio of 2.48 between the quantity of chlorine present and the quantity of ascorbic acid necessary.

According to the instructions for use of the TruitoSEM® biological detector (Cifec, France), the flow rate of the water in the system must be 700 l/h, which can be reduced to 200 l/h. If chlorinated water with 4 mg/l of $Cl_2$ is always considered, a flow of chlorine ranging between 800 and 2800 ppm of $Cl_2$ per hour for flow rates of 200 and 700 l/h, respectively, will thus be present. Thus a flow rate of 1984 to 6944 ppm of ascorbic acid per hour will be required. If a 10% (100 g/l) ascorbic acid solution is used, it will be necessary to inject 19.8 to 69.5 ml of it per hour (approximately 6.6 to 23.2 ml per hour for a 30% ascorbic acid solution, near to the 333 g/l maximum solubility of ascorbic acid found in the literature). However, the necessary low ascorbic acid flow rates pose a metering pump problem. It will thus be a question of integrating into the system a new metering pump which can continuously deliver the low flow rates necessary.

The stability of the ascorbic acid, more precisely the maintenance of its reducing power, is an important parameter within the framework of an adaptation of the TruitoSEM®. Indeed, the system must be able to function without intervention or regular maintenance by the user. As was seen previously, the spectrophotometric monitoring of an ascorbic acid solution shows a change in the chemical form over time, probably by the combined effect of heat and light. However, the ascorbic acid reaction pathway is complex and can lead to chemical species which retain a strong reducing power. This reducing power was verified over time by iodometry (volumetric analysis) for a 10% ascorbic acid solution stored in darkness at ambient laboratory temperature (approximately 20° C.).

The tests show a weak reduction in reducing power over time (−10% after 35 days). A 10% ascorbic acid solution can thus be used over a period of 35 days if it is kept away from light. This period is increased if a more concentrated (20%) ascorbic acid solution is used.

In order to ensure effective dechlorination, it is advantageous to control the system using a chlorine analyzer (a metering pump controlled by a chlorine analyzer). However, to avoid this metering pump control, it is possible to work with a slight excess of ascorbic acid. Ascorbic acid is not directly toxic for trout fingerlings, however the dechlorination oxidation-reduction reaction can lead to a decrease in pH and/or dissolved oxygen. Experiments were thus carried out in this area on artificially chlorinated distributed water to verify these effects.

According to the tests above, an excess of ascorbic acid has a relatively limited effect on the pH of treated water. Under conditions similar to those encountered with water distributed in North America, a maximum decrease of 10% in pH for an ascorbic acid concentration that was double with respect to the stoichiometry was noted. It should be noted that the pH still remains in a range favorable to the survival of trout fingerlings regardless of the initial pH of the distributed water. Likewise, under these conditions, the excess ascorbic acid leads to a maximum decrease in dissolved oxygen of 10%.

Ascorbic acid thus seems to be effective for the dechlorination of treated water. Indeed, all the experiments carried out stoichiometrically or with a slight excess of reducing agent made it possible to obtain residual chlorine concentrations below the limit of detection (<0.1 mg/l).

In addition, ascorbic acid can be used in excess, and by being based on the optimal pH range for trout fingerlings (6 to 8), the treatment by ascorbic acid could be used for drinking water having a pH between 6 and 8.5, which covers most of the pH range authorized for distributed water (6<pH<9).

L-ascorbic acid (or "vitamin C") is a product with reducing properties which reacts with chlorine according to the following reaction:

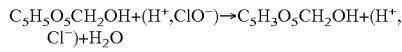

$$C_5H_5O_5CH_2OH+(H^+,ClO^-) \rightarrow C_5H_3O_5CH_2OH+(H^+, Cl^-)+H_2O$$

This chemical product degrades over time if precautions are not taken. It must therefore be used under the specific conditions which were established during tests carried out by the inventors:

the ascorbic acid must be prepared at a concentration close to its maximum solubility (333 g/l);

it must be maintained in darkness and at a temperature below 25° C. (ascorbic acid degrades in light and at high temperature).

Under these conditions, it was shown that the ascorbic acid degrades over time into dehydroascorbic acid, but this by-product exhibits a reducing activity equivalent to that of the initial ascorbic acid.

Thus, under the conditions established by the tests performed, the power of ascorbic acid (or its by-products) to act on chlorine is total over a period of 60 days.

If these conditions are not observed, other by-products are generated (furoic acid, ethylglyoxal, reductones, etc.), compounds which exhibit a lessened reducing activity.

The concentration of the product and the injection flow rates appeared determining.

The ascorbic rate of acid must be monitored by the measurement of the chlorine content in the water to be treated (in-line measurement of chlorine using commercial devices) or be fixed if the average value of the chlorine present in the water to be treated is known.

The concentrations of ascorbic acid to add to eliminate all chlorine in the water to be treated are given by the relationship: 9.92 mg/l of ascorbic acid for 4 mg/l of chlorine in the form of $ClO^-$, $HClO$ or $ClO_2$ (expressed in $Cl_2$).

The optimal theoretical stoichiometric concentration ratio of ascorbic acid to $Cl_2$ must be 2.48.

The injection flow rates of ascorbic acid required to eliminate chlorine will depend on the operating flow rates of the biological pollution detectors for which this method is intended, and will need to be controlled by the use of a metering pump.

It appeared that the type of mixer used upstream of the biological detector is significant, as this mixer must allow a perfect mixing of the ascorbic acid with the water to be treated.

The product used to eliminate the chlorine in the water can be used over a longer period (>60 days); but, in this case, a measurement of its presence may be necessary. A detection module using a redox probe or spectrophotometry can thus be added to measure the quantity of the reagent still present after this optimal period of operation.

The method developed is optimal for treating water whose pH lies between 6 and 8.5. A measurement of pH at the inflow of the device can thus make it possible to validate the correct operation of the proposed method.

These two devices are in no case obligatory for the correct operation of the method developed but can make it possible to expand the range of the water to be treated and to adapt the quantities of the reagents used.

Likewise, the ascorbic acid solution must be maintained in darkness at a temperature lower than 25° C. Because this temperature is likely to be exceeded depending on the location, the custom manufacture of a Peltier-effect refrigerator, according to the dimensions of the solution reservoir, is advantageous. This refrigerator makes it possible to achieve 25° C. below the ambient temperature, thus it can be used up to an ambient temperature of 25° C.+25° C.=50° C., clearly a maximum temperature in the shade for nearly all of the locations in which such equipment is used. It should be noted that since the Peltier effect is reversible, this same refrigerator makes it possible to heat the ascorbic acid solution reservoir above the freezing point during periods of extreme cold.

The method developed was validated on several points:

1) Reaction kinetics between the ascorbic acid and the chlorine to be eliminated.

The method must make it possible to eliminate the chlorine in a flowing system; thus the reaction kinetics must be very rapid. So that the reaction takes place under the best conditions, it is necessary that the mixer, used to place the chlorine and the ascorbic acid in contact, allows the rapid homogenization of the two fluids.

The inventors used an in-line static mixer comprised of helicoid-shaped elements made of polyacetal (Bioblock, France). Thanks to the helicoid geometry of its elements, the flow entering the mixer is separated into two, a vortex is created within the helicoid element, and then the flow is again separated into two by the following helicoid element but in the opposite direction. This alternation of movement guarantees a homogeneous mixture (12 helicoid elements inserted in series in a pipe with an internal diameter of 1.3 cm). It was proven that such a system allowed the complete elimination of chlorine as of the mixing with ascorbic acid.

2) Effectiveness of ascorbic acid over time.

As shown in FIG. 1, if the ascorbic acid is stored under optimal conditions, its effectiveness to eliminate chlorine remains optimal for 60 days if the ascorbic acid concentration is at least 20% (200 g/l). It was proven that the action of the elimination of the chlorine was in fact related both to the ascorbic acid and to its by-product, dehydroascorbic acid. Thus, after 60 days of use under the defined injection conditions, the effectiveness of the product remains approximately 95%.

3) Influence of the reaction on physicochemical parameters (pH and dissolved $O_2$) and optimization of the ascorbic acid injection flow rate.

Given the low flow rates of ascorbic acid to inject into the system, a Stepdos (KNF, Germany) precise low-flow-rate metering pump was installed. This pump makes it possible to inject an ascorbic acid solution at flow rates between 0.03 and 30 ml per minute. However, so that the dechlorination is optimal, it is necessary that the mixture of the chlorinated water, arriving at a high flow rate, and the ascorbic acid, arriving continuously at a low flow rate, is maximal. The answer to this with respect to the experimental assembly is the use of the in-line mixer mentioned above comprised of a reinforced PVC pipe equipped with several helicoid polyacetal elements. The number of elements (Re) inserted in the pipe was determined by the Reynolds equation:

$$Re = \frac{4705 D * \Delta}{\mu * \theta}$$

with D the flow rate in liters/minute, $\Delta$ the density of the fluid, $\mu$ its viscosity, and $\theta$ the internal diameter of the pipe in cm.

The application of this formula to this example (a pipe with an internal diameter of 1.3 cm) gives a Reynolds number (Re)>1000 and thus the number of elements required is between 6 and 12.

The dechlorinated water flowing out of the mixer directly feeds the aquarium, which is equipped with two probes to measure dissolved oxygen, pH and temperature in real time. The aquarium is maintained under permanent aeration so that stress is not induced in the fish due to a lack of dissolved oxygen.

At the beginning, a test in the absence of the trout fingerlings made it possible to regulate the flow rate of the metering pump for the injection of ascorbic acid. The graph in FIG. 2 shows that for an initial chlorine concentration of 4.5 mg/l expressed in equivalent $Cl_2$, a dechlorination yield of close to 100% is obtained for a 20% ascorbic acid flow rate of 0.030 l/h. This flow rate is greater than the stoichiometry of the ascorbic acid/$Cl_2$ reaction and corresponds to a ratio R=D1/D2 of 2.5 in FIG. 2.

The pH and $O_2$ curves diverge at this point. Beyond this flow rate, the pH starts to decrease while the oxygen remains stable.

It is essential to monitor these two parameters ($O_2$, pH) for the survival of fish: any change in these parameters that is too great will lead to negative effects on the movement of fish, even lethal effects if these parameters drop suddenly.

From the point of view of fish survival only, an ascorbic acid flow rate (R=4) of 0.048 l/h (otherwise a variation in pH>0.2 units) should not be exceeded. From the point of view of the operation of a biological detector, the ascorbic acid must not be in too great an excess because if it is it will react with the toxic products (it will mask the presence of these compounds), and thus it is necessary to be as close as possible to the minimum ascorbic acid flow rate necessary, and just necessary, to react with the chlorine present.

In addition, no effect by the ascorbic acid on dissolved oxygen content and a moderate effect on pH is observed, up to a flow rate of 0.060 l/h (R=D1/D2=5 in FIG. 2), which is double the concentration of ascorbic acid necessary.

The same experiment was reproduced with an ascorbic acid solution stored for 60 days away from the light and at ambient temperature. It can be noted that dechlorination is effective for an ascorbic acid flow rate slightly higher than the optimal setting previously determined (0.036 l/h (R=3) instead of 0.030 l/h (R=2.5)). The ascorbic acid thus maintains a strong reducing power if it is stored under proper conditions.

These tests were carried out with the same ascorbic acid which had been used during the preceding experiment (stored under the temperature and darkness conditions).

It is noted that it is necessary to work at a higher flow rate than previously to eliminate the chlorine initially present. Nevertheless, the variation in flow rate is small: it increases from 0.03 l/h to 0.036 l/h, which is from R=2.5 to R=3; this variation in flow rate is explained by the slight loss of reducing activity for the ascorbic acid after 60 days (activity reduced by 5%; see curves in FIG. 1, but as can be seen the flow rate increased by 16%). This difference (5%-16%) is explained by a decrease in the reaction kinetics: the reducing activity is diminished (by 5%) and the speed at which this ascorbic acid (60 days old) reacts with the chlorine is diminished by 16%.

All this justifies the fact that if the dechlorination system is intended for biological detectors for which the ascorbic acid reserve is changed every 60 days, it is better to operate at a safety flow rate of 0.036 l/h (R=3) (and in any event between 0.03 and 0.036 l/h, which is an [ascorbic acid]/[$Cl_2$] mass flow rate ratio R of 2.5 to 3). Beyond 3, there is the risk of masking the presence of other toxic compounds.

To dechlorinate water containing approximately 4 mg/l of disinfectant chlorine expressed in equivalent $Cl_2$, it is thus possible to use a 20% ascorbic acid solution for several weeks. An ascorbic acid flow rate of 0.048 l/h (ratio R=4 in FIG. 2) would make it possible to work in a slight excess and thus to anticipate the degradation of the reducer, as well as a possible sudden increase in the chlorine load in the treated water. In addition, this flow rate has only a very small effect on the physicochemical conditions (pH and dissolved $O_2$) of the water in the aquarium. However, this excess of ascorbic acid would lead to a 30% over-consumption of the reducing agent, and thus to increased costs. Under the operating conditions used during this study, the quantity of ascorbic acid necessary for dechlorination would be approximately 23 liters per month for a flow rate of 0.030 l/h and 35 liters for a flow rate of 0.048 l/h (R=4).

These flowing dechlorination tests were then carried out in the presence of trout fingerlings, for a continuous period of several days. The trout fingerlings showed no abnormal physical signs and normal mobility.

As mentioned above, it is advantageous to work with a slight excess of ascorbic acid. However, it is necessary to evaluate if the ascorbic acid can induce a disturbance in the behavior of the trout fingerlings. Parallel to the flowing dechlorination tests, a control aquarium was thus installed with 6 trout fingerlings living permanently in water containing only ascorbic acid in a large excess (75 mg/l). As for the TruitoSEM, the aquarium was maintained under constant aeration. Observations over 15 days did not show any significant change in the behavior of the trout fingerlings.

The comparative progression of the concentrations of $O_2$, $Cl_2$ and pH represented in FIG. 2 shows that the optimal ratio of the ascorbic acid/chlorine mass flow rates (R=D1/D2) must be between 2.5 and 4, which corresponds to an optimal ascorbic acid injection flow rate between 0.03 and 0.048 l/h under the conditions used in this application example, namely: an ascorbic acid concentration of 200 g/l; a maximum operating flow rate of the biological detector of 700 l/h; a flow rate at the in-flow of the detector after the mixer of 160 l/h; and a level of chlorine in the water to be treated of 4.5 mg/l.

An R=D1/D2 ratio of 3 corresponding to a flow rate of 0.036 l/h under the conditions above is optimal because it makes it possible to remain close to the theoretical stoichiometric ratio while exhibiting a quasi-total reducing power for an acid solution stored for 60 days.

This range makes it possible to obtain a quasi-total reducing power, the $Cl_2$ concentrations measured being at the limit of detection while preserving the pH and the $O_2$ content which are the determining elements for judging toxicity and the possible reaction with other pollutants.

4) Validation of a treatment installation according to the method coupled with a biological detector.

The biological pollution detector described in FR 2,573,875, named "TruitoSEM," with a tank housing a dozen Fario trout fingerlings, was used to validate the developed method with an installation according to FIG. 3 in which the ascorbic acid solution storage reservoir 1 is maintained in darkness in a Peltier-effect refrigerated enclosure before being injected at a mass flow rate D1 (mg/h) into the said solution of chlorinated water to be treated circulating at a mass flow rate D2(mg/h) to be mixed in a helicoid static mixer 2 before being fed into the detector tank 3.

Thus the method presented above made it possible to eliminate the chlorine in spite of an in-flow concentration of 4.5 mg/l of $Cl_2$ in the water to be treated. For a volume flow rate for the water entering the detector of 160 l/h, a volume flow rate for 20% ascorbic acid of 0.036 l/h allowed this complete neutralization for an acid solution stored between 0 and 60 days.

This long-term experiment (8 hours/day for twenty days) under real operating conditions for the biological detector did not generate any mortality and did not show any toxicity for the biological indicators present.

On the other hand, a final test suppressing the injection of ascorbic acid resulted in the immediate death of the trout fingerlings due to a chlorine content in the water of 4.5 mg/l.

What is claimed is:

1. A method of detecting pollutants, including $ClO_3^-$ and $ClO_4^-$, in a circulating flow of water which contains disinfectant chlorine in the form of $ClO^-$ and $HClO$ comprising the steps of:
   providing a reservoir containing an aqueous solution of ascorbic acid;
   rapidly mixing and homogenizing solution dispensed from the reservoir with the circulating flow in a static mixer to remove the disinfectant chlorine to form a treated circulating flow, and
   providing the treated circulating flow to a biological pollution detector in which fish are used as biological indicators,
   wherein the mass flow rate of ascorbic acid of the ascorbic acid aqueous solution is regulated with respect to the mass flow of the disinfectant chlorine, which is expressed in $Cl_2$ equivalence, such that the ratio of ascorbic acid mass flow rate to the disinfectant chlorine mass flow rate is greater than 2.5 and less than or equal to 3, so that $ClO_3^-$ and $ClO_4^-$ will not be eliminated from the circulating flow.

2. A method according to claim 1, wherein the ascorbic acid has a concentration in the aqueous solution greater than or equal to 20%.

3. A method according to claim 1, wherein the ascorbic acid solution is stored in the reservoir for at least 30 days, and comprises dehydroascorbic acid.

4. A method according to claim 3, wherein the ascorbic acid solution is stored for up to 60 days.

5. A method according to claim 1, wherein the ratio (R) is maintained at a value of 3.

6. A method according to claim 1, wherein the said ascorbic acid aqueous solution and the said circulating flow is mixed in a helicoid static mixer.

7. A method according to claim 1, wherein the reservoir is maintained in darkness and at ambient temperature in an enclosure.

8. A method according to claim 1, wherein the ascorbic acid aqueous solution is injected using a metering pump controlled by an analyzer of chlorine concentration in the water to be treated, in such a way as to regulate the mass flow rate of the said injected ascorbic acid aqueous solution as a function of the said chlorine concentration.

9. A method according to claim 1, wherein the disinfectant chlorine of the water to be treated is present in a concentration of between 0.1 and 5 mg/l, expressed in equivalent $C_2$.

10. A method according to claim 1, wherein the water to be treated has a flow rate of between 100 and 1000 l/h.

11. A method according to claim 1, wherein the water to be treated has a pH of between 6 and 8.5.

12. A method according to claim 1, wherein the biological pollution detector is an aquarium or a fish pond, and said circulating flow of water contains a level of chlorine that is incompatible with the survival of fish used in the said aquarium or fish pond.

13. A method according to claim 12, wherein the fish used is trout fingerlings.

14. A method according to claim 12, wherein the disinfectant chlorine level in the circulating flow of water after mixing with the ascorbic acid solution is maintained at a value lower than or equal to 0.6 mg/l, expressed in equivalent $Cl_2$.

15. A method according to claim 14, wherein the disinfectant chlorine level in the circulating flow of water after mixing is maintained at a value lower than or equal to the detectable limit of 0.1 mg/l, expressed in equivalent $Cl_2$.

* * * * *